(12) United States Patent
Davidov et al.

(10) Patent No.: US 9,619,208 B2
(45) Date of Patent: Apr. 11, 2017

(54) SYSTEM, APPARATUS, AND METHOD TO FACILITATE MANAGEMENT OF AGILE SOFTWARE DEVELOPMENT PROJECTS

(71) Applicant: International Business Machines Corporation, Armonk, NY (US)

(72) Inventors: Barak Davidov, Tel-Aviv (IL); Rotem Klein, Kiryat Ono (IL); Moshe Weiss, Petah Tiqwa (IL)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 14/735,010

(22) Filed: Jun. 9, 2015

(65) Prior Publication Data
US 2016/0364210 A1 Dec. 15, 2016

(51) Int. Cl.
*G06F 9/44* (2006.01)

(52) U.S. Cl.
CPC . *G06F 8/20* (2013.01); *G06F 8/10* (2013.01)

(58) Field of Classification Search
CPC .................................................... G06Q 10/06
USPC ........................................................ 717/101
See application file for complete search history.

(56) References Cited

U.S. PATENT DOCUMENTS

| | | | |
|---|---|---|---|
| 2007/0168918 A1* | 7/2007 | Metherall | G06Q 10/06 717/101 |
| 2009/0327002 A1 | 12/2009 | Chapman et al. | |
| 2011/0184776 A1 | 7/2011 | Spradling et al. | |
| 2012/0227044 A1 | 9/2012 | Arumugham et al. | |
| 2014/0257901 A1 | 9/2014 | Murthy | |
| 2014/0282352 A1* | 9/2014 | Alonzo | G06Q 10/06 717/101 |
| 2015/0324723 A1* | 11/2015 | Ben-Yehuda | G06F 8/77 717/101 |
| 2016/0004982 A1* | 1/2016 | Cantor | G06N 7/005 717/101 |

OTHER PUBLICATIONS

Anonymously; "Automate agile estimation to establish team velocity"; An IP.com Prior Art Database Technical Disclosure; http://ip.com/IPCOM/000220477; Aug. 1, 2012.

(Continued)

*Primary Examiner* — Andy Ho
(74) *Attorney, Agent, or Firm* — Kunzler Law Group

(57) ABSTRACT

An apparatus to facilitate management of agile software development projects includes a feature profile module, a task profile module, a resource profile module, an implementation tracking module, a resource planning module, and an feature tracking module. The feature profile module stores, for each feature, a status, priority, set of tasks, and work allotted. The task profile module stores, for each task, an amount of work to complete it, a status, and a development period. The resource profile module calculates, for each resource, an available and total work capacity for the resource during a development period. The implementation module calculates, for each development period, the total work planned for and completed during the development period. The resource planning module calculates a total available work capacity of the plurality of resources for each uncompleted development period. The feature tracking module calculates, for each feature, an amount of work completed and in progress.

20 Claims, 9 Drawing Sheets

(56) References Cited

OTHER PUBLICATIONS

Anonymously; "A Tool for Work Plan Health Assessment"; An IP.com Prior Art Database Technical Disclosure; http://ip.com/IPCOM/000225664; Feb. 25, 2013.
Anonymously; "Implementing Jigsaw-Puzzle-Model Tool Technique in Agile Method in Software Development Environment"; An IP.com Prior Art Database Technical Disclosure; http://ip.com/IPCOM/000203507; Jan. 27, 2011.
Anonymously; "Method for automated monitoring instrumentation of application middleware within cloud computing infrastructure"; An IP.com Prior Art Database Technical Disclosure; http://ip.com/IPCOM/000235859; Mar. 27, 2014.

* cited by examiner

SYSTEM, APPARATUS, AND METHOD TO FACILITATE MANAGEMENT OF AGILE SOFTWARE DEVELOPMENT PROJECTS

FIELD

The subject matter disclosed herein relates to facilitating project management for software development and more particularly relates to facilitating project management for agile software development.

BACKGROUND

Agile software development refers to a software development methodology that emphasizes close collaboration between the software development and business teams, early and continuous delivery of working software, continuous improvement, adaptive planning, and being flexible and responsive to changes in user requirements. In agile software development, each release version of the software application is developed over many iterations, with each iteration typically lasting short periods of time. An iteration focuses on the completion of a planned set of discrete incremental tasks derived by breaking down high level user requirements or features, and a feature is typically referred to as a "user story." At the end of an iteration, a working version of the software application is demonstrated to stakeholders for feedback.

In agile software development, the unit of measurement for the time and/or effort required for a development team to complete a discrete task is often referred to as a "story point," and a feature or user story is associated with a number of story points based on the number of discrete tasks needed to implement the feature. Software projects using agile software development can track the progress of the project by tracking, out of the total number of planned story points for a particular release or iteration of the software application, i) how many number of story points have been completed, ii) how many story points remain to be completed, and iii) their rate of completion. This information may be represented graphically.

BRIEF SUMMARY

An apparatus to facilitate management of agile software development projects is disclosed and includes a feature profile module, a task profile module, a resource profile module, an implementation tracking module, a resource planning module, and an feature tracking module. The feature profile module stores, for each feature of a software application, a status, a priority, a set of associated tasks, and an amount of work allotted to implement the feature. The task profile module stores, for each task associated with a feature, an amount of work to complete the task, a status of the task, and an associated development period. The resource profile module calculates, for each resource assigned to develop the software application, an available work capacity and a total work capacity for the source during a period of development periods. Development periods include completed and uncompleted development periods. The implementation module calculates, for each development period, the total work planned for and completed during the development period. The resource planning module calculates a total available work capacity of the plurality of resources for each uncompleted development period. The feature tracking module calculates, for each feature, an amount of work completed and in progress for the feature.

A method to facilitate management of agile software development projects is disclosed, the method i) storing, for each feature of a software application, a status, a priority, a set of associated tasks, and an amount of work allotted to implement the feature; ii) storing, for each task associated with a feature, an amount of work to complete the task, a status of the task, and an associated development period; iii) calculating, for each resource assigned to develop the software application, an available work capacity and a total work capacity for the source during a period of development periods, where development periods include completed and uncompleted development periods; iv) calculating, for each development period, the total work planned for and completed during the development period; v) calculating a total available work capacity of the plurality of resources for each uncompleted development period; and vi) calculating, for each feature, an amount of work completed and in progress for the feature.

A computer program product to facilitate management of agile software development projects is disclosed, the computer program product incorporates program instructions to i) store, for each feature of a software application, a status, a priority, a set of associated tasks, and an amount of work allotted to implement the feature; ii) store, for each task associated with a feature, an amount of work to complete the task, a status of the task, and an associated development period; iii) calculate, for each resource assigned to develop the software application, an available work capacity and a total work capacity for the source during a period of development periods, where development periods include completed and uncompleted development periods; iv) calculate, for each development period, the total work planned for and completed during the development period; v) calculate a total available work capacity of the plurality of resources for each uncompleted development period; and vi) calculate, for each feature, an amount of work completed and in progress for the feature.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
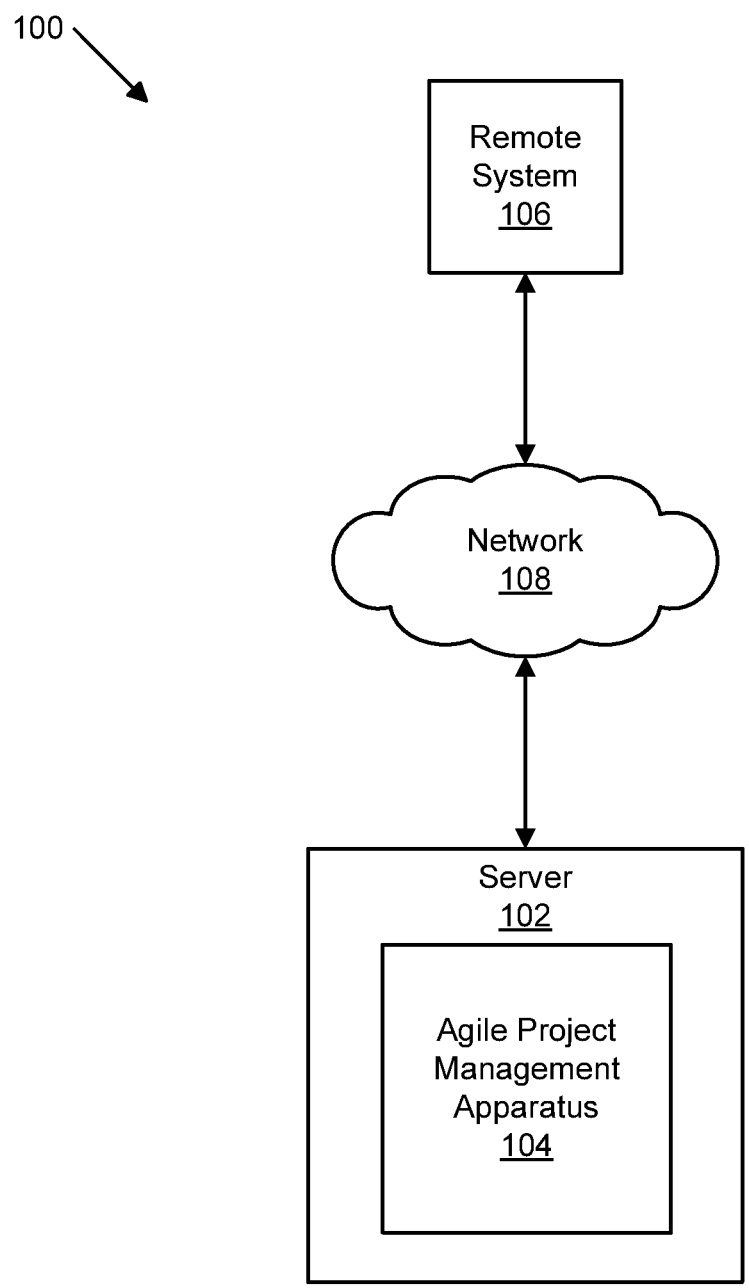
FIG. 1 is a schematic block diagram illustrating one embodiment of a system to facilitate management of agile software development projects in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 is a schematic block diagram illustrating one embodiment of a system 100 for facilitating management of agile software development projects. The system 100 includes a server 102, an agile development management apparatus 104, a remote system 106, and a network 108, which are described below.

Figure 2:
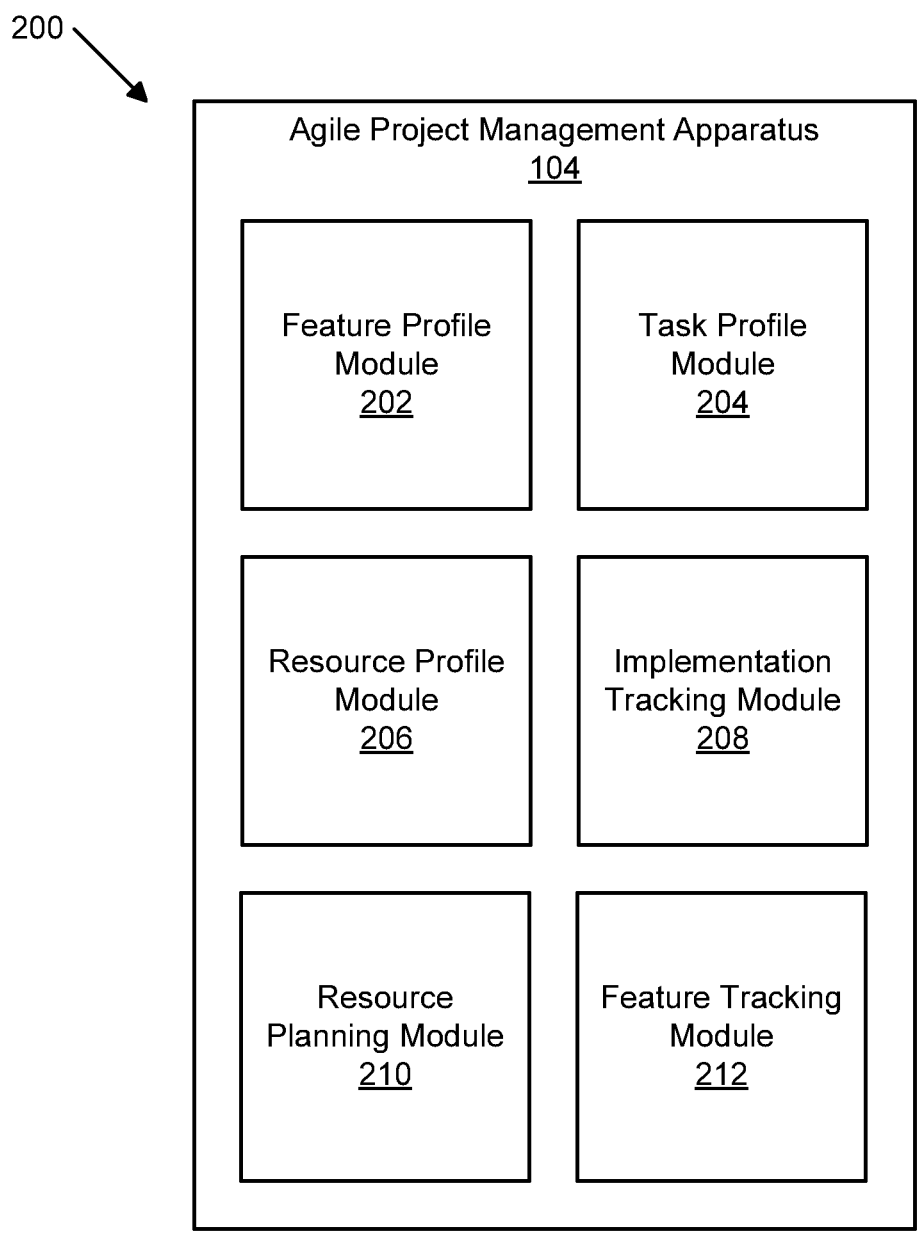
FIG. 2 is a schematic block diagram illustrating one embodiment of an apparatus to facilitate management of agile software development projects in accordance with one embodiment of the present invention.
Figure 3:
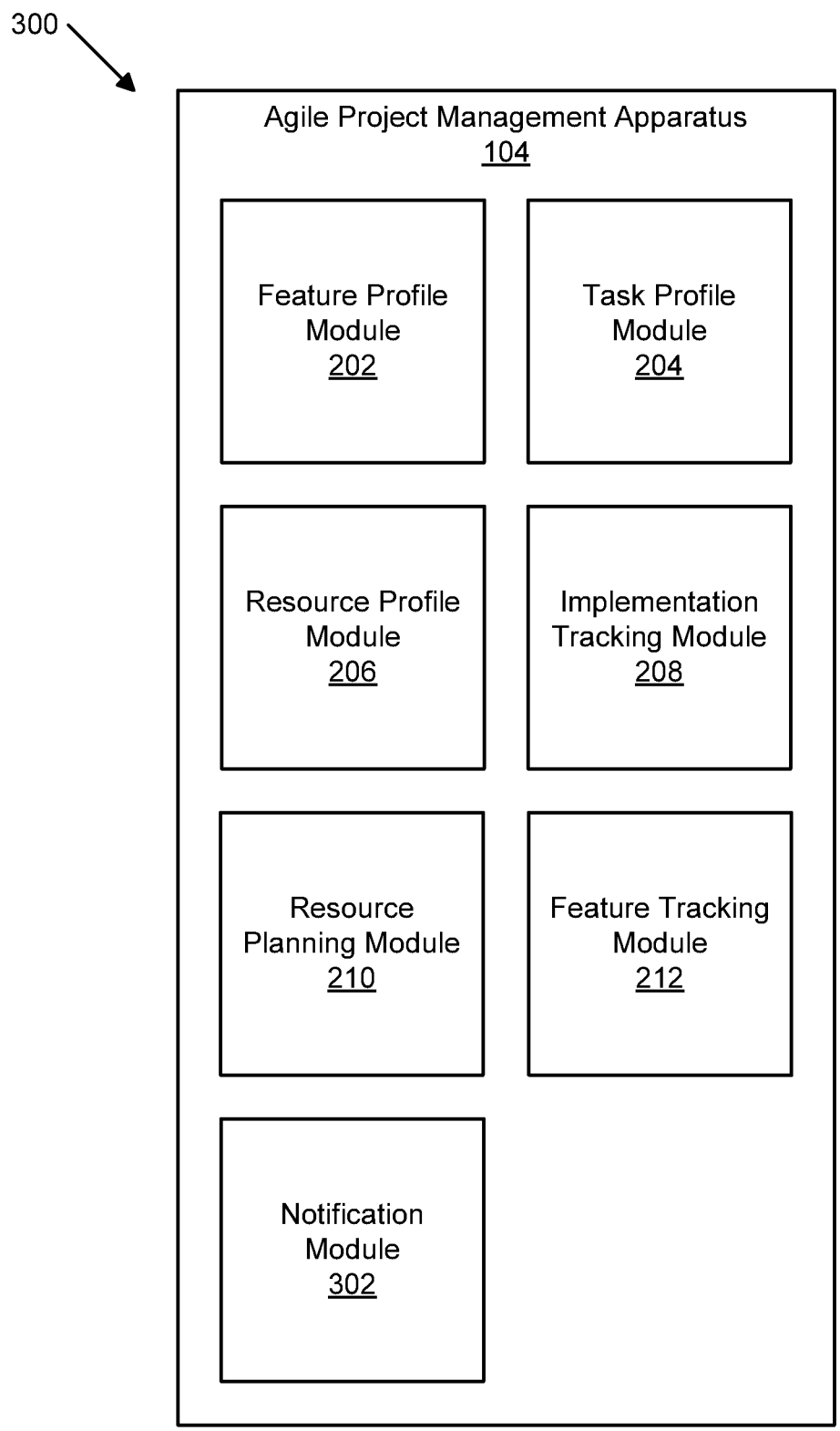
FIG. 3 is a schematic block diagram illustrating one embodiment of another apparatus to facilitate management of agile software development projects in accordance with one embodiment of the present invention.

The system 100, in one embodiment, includes a server 102 with agile development management apparatus 104, which is described in further detail with respect to FIGS. 2 and 3. In one embodiment, the server 102 may be any computer accessible by a remote system 106 over a network 108. In another embodiment, the server 102 may be any computer directly connected to a remote system 106 via cable, fiber or other connection equipment known to those in the art. The server 102 can be a database server, a mainframe server, a workstation, a desktop computer, or the like. The remote system 106 may be any computer or other electronic device that can be accessed by the server 102. For example, the remote system 106 may be a laptop or desktop computer, a tablet, a smartphone, a television, another server, etc. The remote system 106 may be a human resources database, a scheduling system, an inventory system, and/or a source code repository. In one embodiment, the system 100 may include multiple remote systems 106. The network 108 may include a local area network ("LAN"), a wide area network ("WAN"), wireless network, cellular network, the Internet, a fiber optic network, or the like. In one embodiment, the network 108 includes multiple networks. For example, the network 108 may include a cellular network along with another network capable Internet connection. In another example, the network 108 includes a wireless network along with a wired network. The network 108 may include switches, routers, servers, cabling and other equipment known to those in the art.

FIG. 2 is a schematic block diagram illustrating one embodiment of an apparatus 200 for facilitating management of agile software development projects. The apparatus 200 includes one embodiment of an agile development management apparatus 104 with a feature profile module 202, a task profile module 204, a resource profile module 206, an implementation tracking module 208, a resource planning module 210, and a feature tracking module 212, which are described below.

The feature profile module 202 stores, for each feature of a software application undergoing development, a status of the feature, a priority of the feature, a set of tasks associated with the feature, and an amount of work allotted to implement the feature. A feature of a software application can be broad or narrowly defined. For example, a feature may be an entire framework used to support other features. As another example, a feature may be a specific function of the software application. In one embodiment, a feature may include several other features. The status of a feature indicates whether the feature will be completed before the planned release date of the software application. In one embodiment, the status of a feature is a binary (e.g., positive/negative, on time/delayed, will be delivered/will not be delivered). In another embodiment, the status has more possible values to provide additional information. For example, the status may be a numerical value indicating a completion percentage for the feature. Each feature of the software application has a priority. A priority indicates the importance of the feature relative to other features in the software application. In one embodiment, each feature has a unique priority. In other embodiments, a feature may have a priority equal to one or more other features. In these embodiments, it is possible to have tiers of priority with one or more features in a particular tier. A priority may be represented in a plurality of ways (e.g., alphanumeric, color, and/or symbolic).

The implementation of a feature can be divided into discrete tasks. As described above, the unit of measurement for the amount of work that a developer or development team must expend to complete a discrete task is typically referred to as a "story point." For example, completion of a specific task may take an estimated two story points. The amount of work required to implement a feature is the sum of the story points required to complete the set of tasks pertaining to the feature. A story point may represent a specific measurement of time. For example, a story point may represent an hour, four man hours, or one work day by a two person development team. The feature profile module 202 may store the set of tasks associated with the feature, the priority of the feature, and the estimate of total work units to implement the feature in a variety of different forms (e.g., database, flat file).

The task profile module 204 stores, for each task associated with a feature of the software application undergoing development, an amount of work required to complete the task, a status, and an associated development period. In one embodiment, the status of a task is a binary (e.g., true/false). In another embodiment, the status has more possible values to provide additional information. For example, the status may be a numerical value indicating the completion percentage for the task. A task may be simultaneously associated with more than one feature of the software application. But a task is associated with only one development period at a time. A development period for a software application is a specific time period where active software development (i.e., programming) takes place. Development periods may be completed and uncompleted. Uncompleted development periods may be development periods currently in progress or future development periods that have not yet started. In one embodiment, a development period may include a plurality of shorter development periods. For example, a release cycle of six months may include six iterations that are each one month long. The shorter development periods within a larger development period may or may not be of equal length. A task is associated with a development period when it is assigned to be completed during that development period.

The resource profile module 206 calculates, for each resource of a plurality of resources assigned to develop the software application, an available work capacity and a total work capacity for the resource during a plurality of development periods. The resource profile module stores a list of each resource assigned to develop the software application. A resource assigned to develop a software application is typically either a software programmer or business expert who understands user requirements for the software application being developed. The total work capacity for a resource assigned to develop the software application during a development period is the total amount of time that the resource can devote to the development of the software application during that development period. Since a resource may be assigned to multiple software development projects, only a portion of the total work capacity of a resource may be available for the development of the software application. This portion is the available work capacity of the resource during the development period for the software application. Total work capacity and available work capacity may vary between resources. For example, one software developer may have less time to work on software development during an iteration because of illness, vacation, maternity leave, and/or other time constraints.

In one embodiment, the resource profile module 206 calculates the total work capacity and available work capacity of the plurality of resources from a data source by synching with a calendar/scheduling program to determine the total amount of time that a resource has during one or more development periods. For example, the resource profile module 206 may synch (either in real time or periodically) with a software programmer's online based scheduling application and sum up the total number of hours that the programmer has actively scheduled to work on the software application during the present or next iteration. In another example, the resource profile module 206 may calculate the total number of work hours in an iteration, access a development team's network based calendar application, and subtract the amount of time reserved for non-development related activities (e.g., meetings, other projects, training, holiday, vacation) to calculate the amount of time that the development team members are available. In some examples, the resource profile module 206 may employ a combination of both approaches.

The implementation tracking module 208 calculates, for each development period, a total work planned for and total work completed during the development period. The implementation tracking module 208 calculates the total work planned for a development period by determining the set of tasks associated with the development period and adding up the amount of work required for each task in this set of tasks. In one embodiment, the set of tasks assigned to a development period is identical to a set of tasks stored by the feature profile module 202 for a feature of the software application. In another embodiment, the set of tasks assigned to a development period is a subset of a set of tasks stored by the feature profile module 202 pertaining to a feature. In certain embodiments, the set of tasks assigned to a development period is a combination of discrete tasks from a multiple sets of tasks stored by the feature profile module 202. For example, the set of tasks assigned to an iteration may include 50 separate tasks spanning four features of the software application, and the implementation tracking module 208 will add up the story points for each task to calculate the total number of story points planned for the iteration.

The implementation tracking module 208 calculates the total work completed during a development period by determining the set of tasks i) associated with the development period and ii) that has a status showing that the task has been completed, and then totaling the amount of work required for each task in this set of tasks. In one embodiment, the implementation tracking module 208 will automatically calculate the total work completed during a future development period to be zero.

The implementation tracking module 208 calculates a completion percentage for the software application. In one embodiment, the completion percentage for a software application is a function of the number of features that have been implemented relative to the total number of features in the software application. In another embodiment, the completion percentage for a software application is a function of the number of tasks completed relative to the total number of tasks associated with the features of the software application. In still another embodiment, the completion percentage for a software application is the function of the amount of work completed (e.g. 257 story points, 526 hours) relative to the total amount of work allotted to implement the total number of features in the software application. The completion percentage for the software application may be measured over one or more development periods. For example, the implementation tracking module 208 may calculate the rate of completion for just one iteration, multiple iterations, or all iterations (i.e. the entire release cycle).

The implementation tracking module 208 also calculates a scheduled completion percentage for the software application. In one embodiment, the scheduled completion percentage for a software application is a function of the number of features that should have been implemented at the end of a development period relative to the total number of features in the software application. In another embodiment, the scheduled completion percentage for a software application is the function of the number of tasks that should have been completed relative to the total number of tasks associated with the features of the software application. In still another embodiment, the scheduled completion percentage for a software application is the function of the amount of work that should have been completed (e.g. 257 story points, 526 hours) relative to the total amount of work allotted to implement the total number of features in the software application. The scheduled completion percentage for the software application may be measured over one or more development periods. For example, the implementation tracking module 208 may calculate the rate of completion for just one iteration, multiple iterations, or all iterations (i.e. the entire release cycle).

The implementation tracking module 208 also calculates a completion index of the software application. The completion index of a software application is a function of the software application's completion percentage relative to its scheduled completion percentage. For example, if the completion percentage of a project is 60% when its scheduled completion percentage is supposed to be 75%, then the project's completion index would have a value of 1.25 (75/60). The completion index can be expressed in combination with other forms, including graphically. For example, the completion index can be expressed in the form a gauge with a "needle" pointing to the gauge location of the completion index value. The gauge may be semi-circular, horizontal, or vertical. The gauge may also be color coded to show additional details regarding the completion percentage of the software application, the scheduled completion percentage, and other information (e.g., total number of tasks yet to be completed).

The implementation tracking module 208 also calculates a total amount of work remaining to implement each feature of the software application. The total amount of work remaining to implement each feature is the difference between i) the sum of the amounts of work allotted to implement each feature and ii) the sum of the amount of work completed for each feature, which is calculated by the feature tracking module 212, described further below.

The resource planning module 210 calculates a total available work capacity of the plurality of resources assigned to develop the software application for each uncompleted development period. In one embodiment, the resource planning module 210 calculates a total available work capacity of the plurality of resources for an uncompleted development period in response to the addition or removal of a resource from the list of resources assigned to develop the software application.

The resource planning module 210 calculates the total available work capacity of the plurality of resources for an uncompleted development period by summing the available work capacity of each resource assigned to develop the software application during the uncompleted development period. Calculating the total available work capacity for uncompleted development periods allow the system 100 to compare, the available work capacity for an uncompleted development period (currently in progress or future development period) with the amount of work for the set of tasks associated with that development period.

The resource planning module 210 also determines whether an uncompleted development period has a work capacity deficit. A work capacity deficit exists when the total available work capacity of the plurality of resources for a development period is less than the total work planned for the development period. To determine whether an uncompleted development period has a work capacity deficit, the resource planning module compares the total available work capacity of the resources assigned for the uncompleted development period to the total work planned for that development period by the implementation tracking module 208. Determining whether a work capacity deficit exists for a development period will provide projections and early notification to stakeholders.

In one embodiment, the resource planning module 210 may generate suggestions regarding how to remedy a work capacity deficit for a development period. The resource planning module 210 may send these suggestions through the notification module 302, which is described further below.

The feature tracking module 212 calculates, for each feature of the software application, an amount of work completed and an amount of work in progress for the feature. The feature tracking module 212 calculates the amount of work completed for the feature by i) determining the set of tasks associated with the feature, and ii) totaling the amount of work required for each task in this set of tasks whose status shows that it has been completed. The feature tracking module 212 calculates the amount of work in progress for the feature by i) determining the set of tasks associated with the feature, and ii) totaling the amount of work required for each task in this set of tasks and also associated with the current development period.

The feature tracking module 212 also calculates a completion percentage for each feature of the software application. The completion percentage of a feature is a function of the amount of work completed for the feature and the amount of work to implement the feature. For example, if the amount of work to implement a feature is 200 story points and the amount of work completed so far is 150 story points, then the completion percentage of the feature is 75% (150/200).

The feature tracking module 212 also determines the status for each feature of the software application. The status of a feature is a function of the total amount of work remaining to implement each feature, the total available work capacity of the plurality of resources assigned to the development of the software application for the remainder of the current release cycle, and the feature's priority relative to other features. If the total available work capacity of the plurality of resources for the remainder of the current release cycle is more than the total amount of work remaining to implement each feature, then there is sufficient available work capacity and there is a very low likelihood that a feature will be not be implemented. But if the total available work capacity of the plurality of resources is less than the total amount of work remaining, then there is high likelihood that the features with the lowest priority will not be implemented.

In one embodiment, the feature tracking module 212 determines the status for each feature of the software application in the following way. First, the feature tracking module 212 calculates the difference between the total work remaining and the total available work capacity of the plurality of resources. If the difference or "work gap" is zero or has a negative value, the feature tracking module 212 determines that the status of each feature is positive. If the work gap has a positive value, the feature tracking module 212 will examine each feature in ascending priority order (i.e., starting with the feature having the lowest priority) as follows: for each feature, the feature tracking module 212 calculates the amount of work remaining to implement the feature and decrement the work gap by the amount of work remaining. If the work gap still has a positive value, the feature tracking module 212 will determine that the status of the feature is negative (since eliminating the feature did not eliminate the work gap). The feature tracking module 212 continues examining each feature in this manner until the value of the work gap is zero or less, at which point the feature tracking module 212 determines that the statuses of the currently examined and not yet examined features are positive. In certain embodiments, the feature tracking module 212 sets the status of each feature in response to determining its status. In one embodiment, the feature tracking module 212 sets the status of each feature by comparing the current status of the feature and modifying the status if the current status does not match the just determined status.

FIG. 3 is a schematic block diagram illustrating another embodiment of an apparatus 300 for facilitating management of agile software development projects. The apparatus 300 includes one embodiment of an agile development management apparatus 104 with a feature profile module 202, a task profile module 204, a resource profile module 206, a implementation tracking module 208, a resource planning module 210, and a feature tracking module 212, which are substantially similar to those described above in relation to apparatus 200 in FIG. 2. The apparatus 300 also includes a notification module 302, which is described below.

The notification module 302 sends notifications to project managers and other stakeholders in response to specific events. For example, the notification module 302 sends notifications in response to the resource planning module 210 determining that there is a work capacity deficit for a development period. Providing early notification of a work capacity deficit allow project managers and other stakeholders to make informed decisions about managing resources, tasks, and policies. For example, project managers informed of a shortage in available work capacity compared to the total amount of time necessary to complete the tasks associated with a development period can act to mitigate the shortage by shifting resources from other projects, reassigning tasks associated with the uncompleted development period to other uncompleted development periods, or investigating the reason(s) for the shortage. Conversely, project managers informed of a surplus in available work capacity can either reassign resources to other projects facing shortages or reassign tasks from other uncompleted development periods to this uncompleted development period.

The notification module 302 also sends notification in response to the feature tracking module 212 calculating a work gap and determining that its value is positive (i.e., that the total amount of work remaining in the current release cycle is greater than the total available work capacity during the remainder of the release cycle). Timely notification of a work gap allows project managers and stakeholders to investigate, early on, the cause(s) of the work gap and develop solutions to close the work gap. The notification module 302 also sends a notification in response to a change in the status of a feature. In one embodiment, the notification module 320 sends a notification in response to a feature's status changing from positive to negative (i.e., on-time v. delayed). In another embodiment, the notification module 320 sends a notification in response to the feature's status changing from negative to positive.

Figure 4:
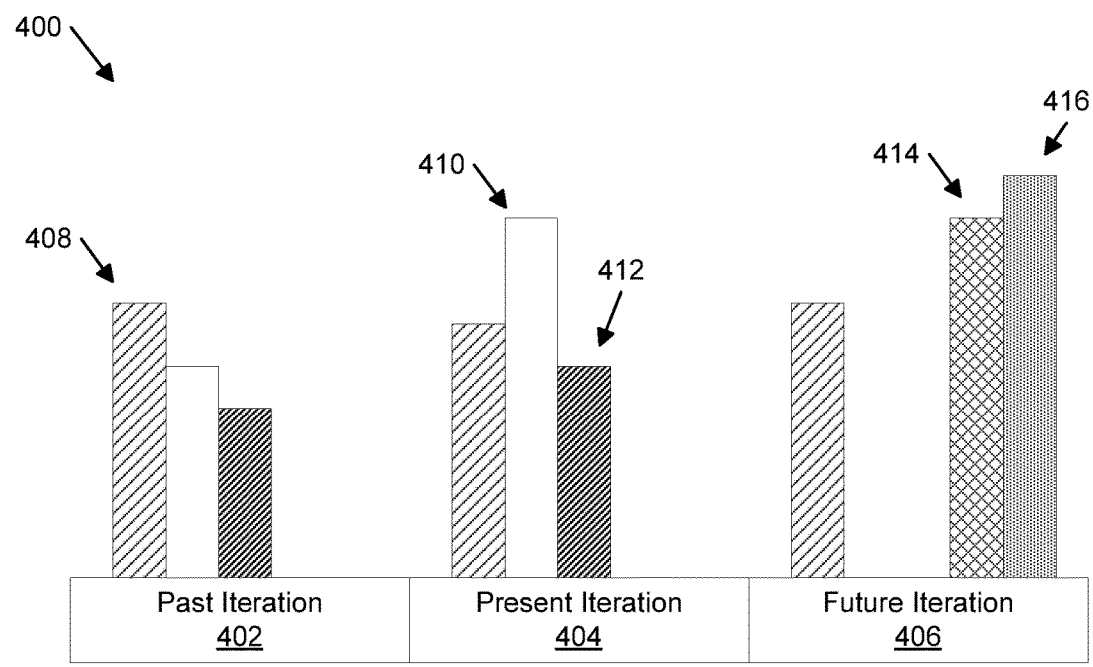
FIG. 4 is a schematic diagram illustrating one embodiment of a user interface element generated by one embodiment of the present invention.

FIG. 4 is a schematic diagram illustrating one embodiment of a user interface element generated by one embodiment of the present invention. FIG. 4 shows a "velocity" chart 400 that shows three iterations, a past iteration 402, a present iteration 404, and a future iteration 406. In the past iteration 402 and present iteration 404 are three vertical bars 408, 410, and 412 representing respectively: i) the total work planned for the iteration at the outset of the iteration (in story points); ii) the total work actually committed to during the iteration; and iii) the total work completed during the iteration. The visual representation of this information allows managers to quickly determine how successful the software development team was in completing the tasks associated with the iteration. In the future iteration 406, there may be total work planned for the iteration (as represented by bar 408), but no total work actually committed to during the iteration or total work completed during the iteration. The future iteration 406 does contain bars 414 and 146 representing respectively: i) the total available work capacity for the iteration and ii) the total work planned for that iteration. The velocity chart here shows, at a glance, that the total available work capacity for the iteration is insufficient to complete the total work planned for that iteration.

Figure 5:
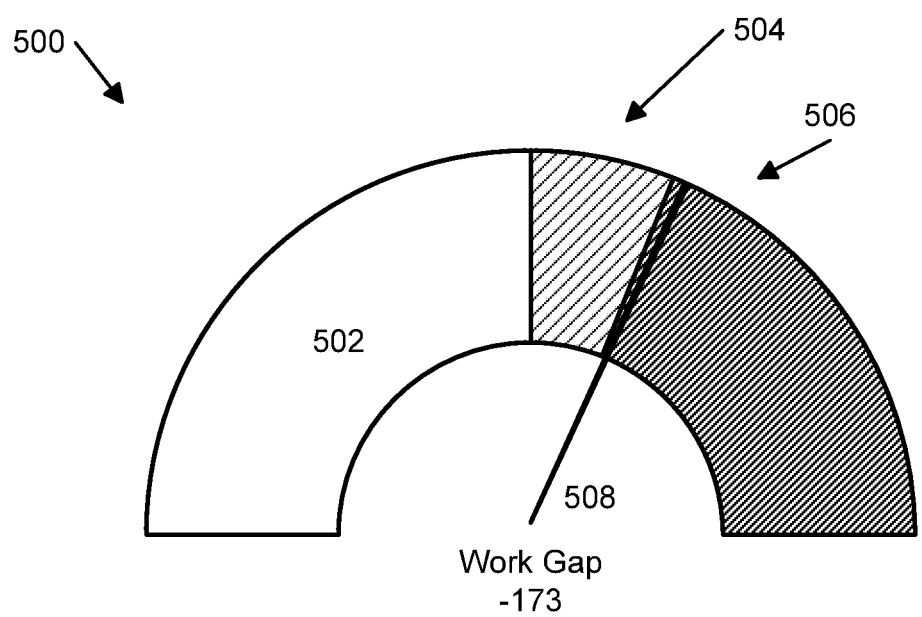
FIG. 5 is a schematic diagram illustrating one embodiment of another user interface element generated by one embodiment of the present invention.

FIG. 5 is a schematic diagram illustrating one embodiment of another user interface element generated by one embodiment of the present invention. FIG. 5 shows a gauge 500 displaying several pieces of data. The left half 502 of the gauge 500 represents the total amount of work completed for the software application. The middle portion 504 of the gauge 500 represents the total amount of work in progress for the software application. The right portion 506 of the gauge 500 represents the total amount of work remaining for the software application. The needle 508 represents the completion index calculated by the implementation tracking module 208. The gauge 500 shows, at a glance, whether all the features of the software application will be completed by the release date.

Figure 6:
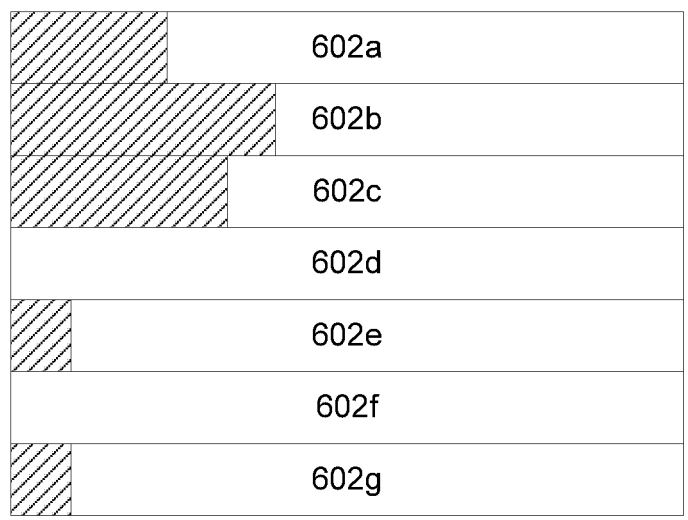
FIG. 6 is a schematic diagram illustrating one embodiment of still another user interface element generated by one embodiment of the present invention.

FIG. 6 is a schematic diagram illustrating one embodiment of still another user interface element generated by one embodiment of the present invention. FIG. 6 shows a progress chart 600 displaying the completion progress of the features for a software application. The horizontal bars 602 show the percentage of each feature that has been completed, and the numbers to the right of each feature name show how many story points have been completed out of the total number of story points assigned to the feature. The features are displayed in descending order by priority. The crossed out features (602e, 602f, 602g) show indicate that there is a work gap, such that these features have negative statuses and are unlikely to be finished at the current rate of progress.

Figure 7:
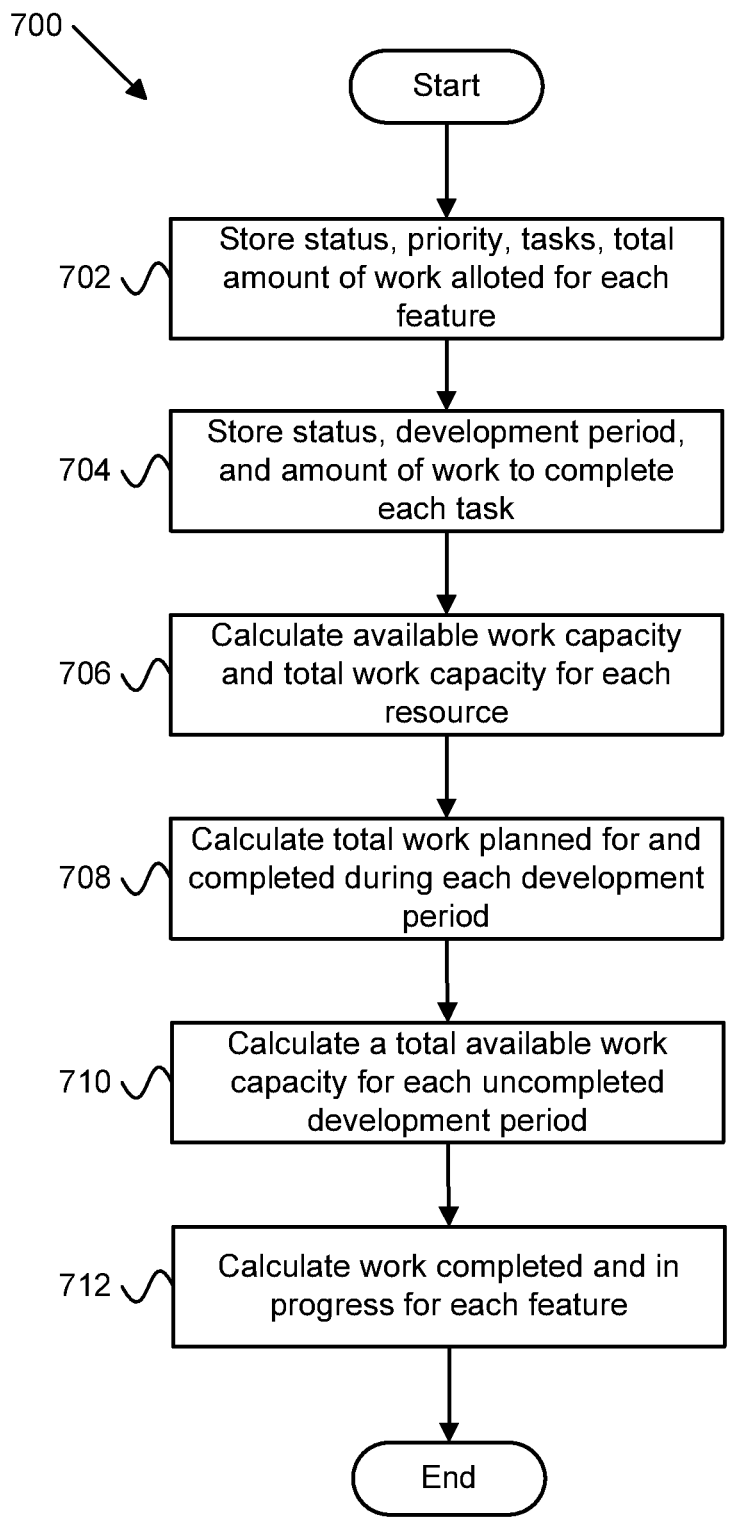
FIG. 7 is a flow chart diagram illustrating one embodiment of a method for facilitating management of agile software development projects in accordance with one embodiment of the present invention.

FIG. 7 is a flow chart diagram illustrating one embodiment of a method 700 for facilitating management of agile software development projects in accordance with one embodiment of the present invention. The method 700 begins and stores 702, for each feature of a software application, a status, a priority, a set of associated tasks, and an amount of work allotted to implement the feature. The method 700 stores 704, for each task associated with a feature, an amount of work to complete the task, a status of the task, and an associated development period. The method 700 calculates 706, for each resource assigned to develop the software application, an available work capacity and a total work capacity for the source during a period of development periods, where development periods include completed and uncompleted development periods. The method 700 calculates 708, for each development period, the total work planned for and completed during the development period. The method 700 calculates 710 a total available work capacity of the plurality of resources for each uncompleted development period. The method 700 calculates 712, for each feature, an amount of work completed and in progress for the feature, and the method 700 ends.

Figure 8:
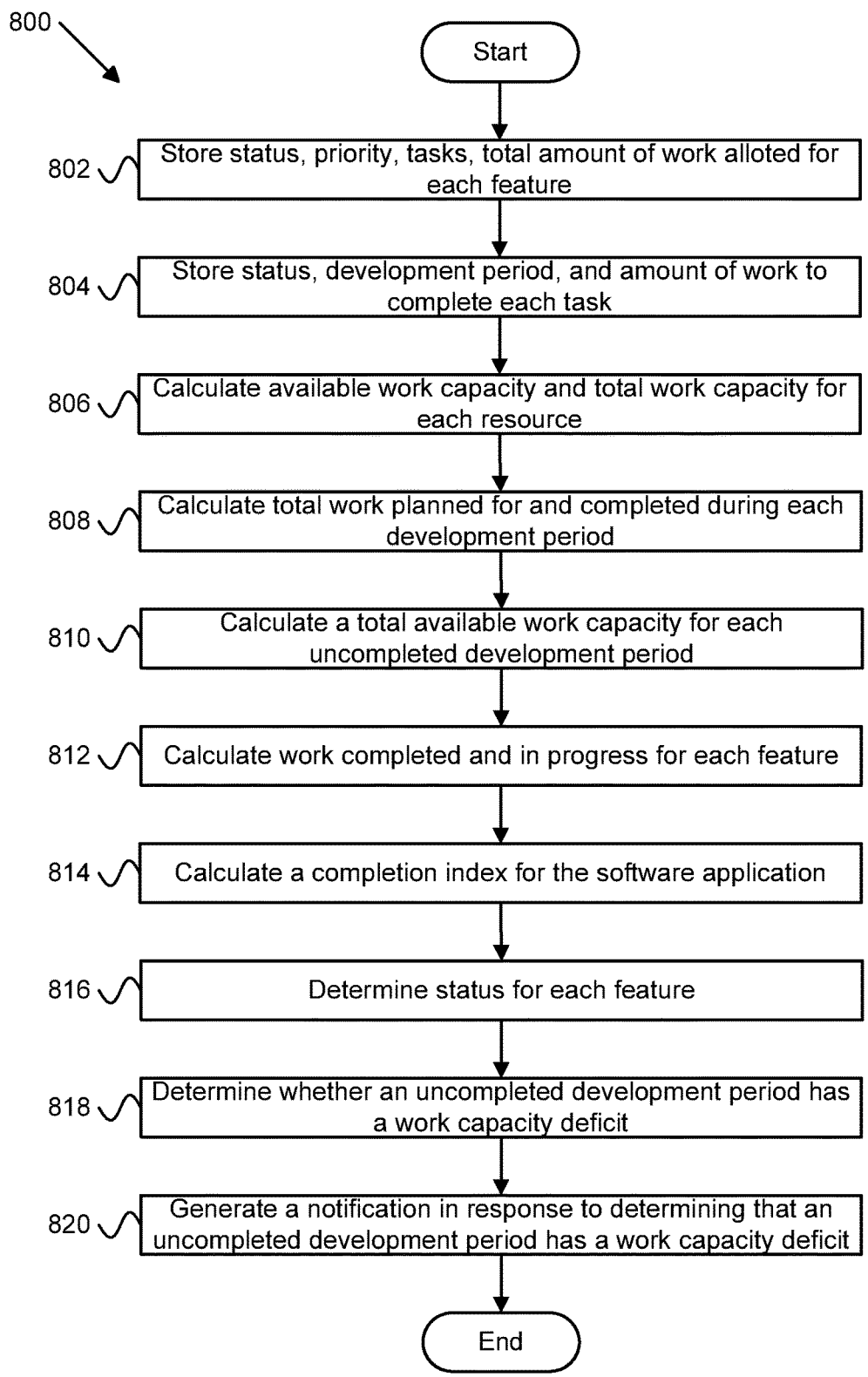
FIG. 8 is a flow chart diagram illustrating another embodiment of a method for facilitating management of agile software development projects in accordance with one embodiment of the present invention.

FIG. 8 is a flow chart diagram illustrating another embodiment of a method 800 for facilitating management of agile software development projects in accordance with one embodiment of the present invention. The method 800 begins and stores 802, for each feature of a software application, a status, a priority, a set of associated tasks, and an amount of work allotted to implement the feature. The method 800 stores 804, for each task associated with a feature, an amount of work to complete the task, a status of the task, and an associated development period. The method 800 calculates 806, for each resource assigned to develop the software application, an available work capacity and a total work capacity for the source during a period of development periods, where development periods include completed and uncompleted development periods. The method 800 calculates 808, for each development period, the total work planned for and completed during the development period. The method 800 calculates 810 a total available work capacity of the plurality of resources for each uncompleted development period. The method 800 calculates 812, for each feature, an amount of work completed and in progress for the feature. The method 800 calculates 814 a completion index for the software application. The method 800 determines 816 a status for each feature of the software application. The method 800 determines 818 whether an uncompleted development period has a work capacity deficit. The method 800 generates 820 a notification in response to determining that an uncompleted development period has a work capacity deficit, and the method 800 ends.

Figure 9:
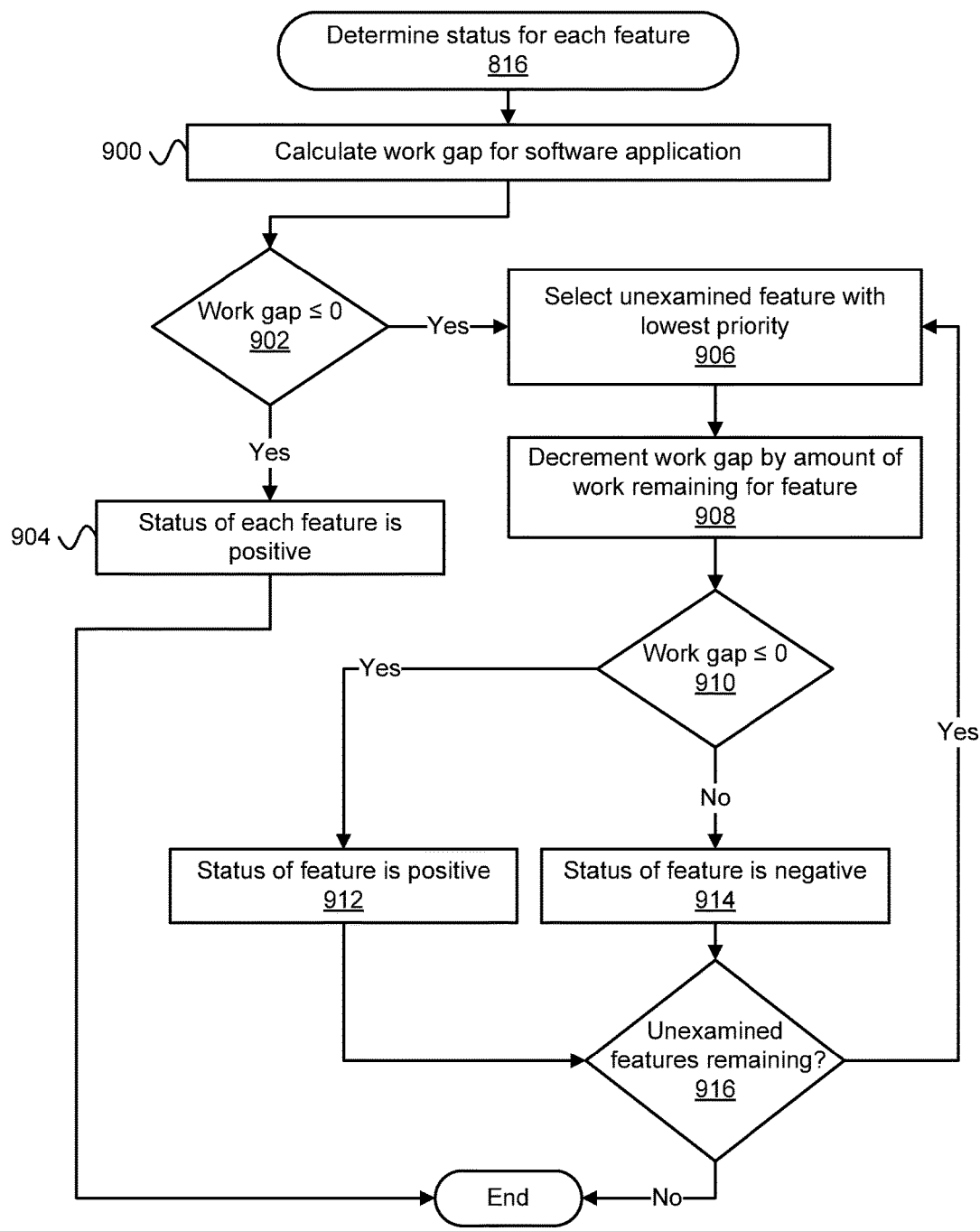
FIG. 9 is a flow chart diagram illustrating the steps of determining 816 the status of each software application feature in accordance with one embodiment of the present invention.

FIG. 9 is a flow chart diagram illustrating the method 816 of determining the status of each software application feature in accordance with one embodiment of the present invention. Determining 816 the status of each software application feature begins with calculating 900 a work gap for the software application. If the method 816 determines 902 that the work gap is less than or equal to zero, the method 816 determines 904 the status of each feature is positive, and the method 816 ends. If the method 816 determines 902 that the work gap is greater than zero, then the method 816 selects 906 the unexamined feature with the lowest priority. The method 816 then decrements 908 the work gap by the amount of work remaining for the selected feature. If the method 816 determines 910 that the work gap, after being decremented, is less than or equal to zero, then the method 816 determines 912 that the status of the selected feature is positive. If the method 816 determines 910 that the work gap, after being decremented, is greater than zero, then the method 816 determines 914 that the status of the selected feature is negative. After the status of the selected feature is determined (912, 914), the method 816 determines 916 whether there are any unexamined features remaining. If the method 816 determines 916 that there are unexamined features remaining, then the method 816 selects 906 the unexamined feature with the lowest priority and repeats its steps from that point. If the method 816 determines 916 that there are no unexamined features remaining, method 816 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to facilitate management of agile software development projects comprising:
a feature profile module that stores, for each feature of a software application, i) a status of the feature, ii) a priority of the feature, iii) a set of tasks associated with the feature, iv) an amount of work to implement the feature;
a task profile module that stores, for each task associated with a feature of the software application, i) an amount of work to complete the task, ii) a status, and iii) an associated development period;
a resource profile module that calculates, for each resource of a plurality of resources assigned to develop the software application, an available work capacity and a total work capacity for the resource during a plurality of development periods, wherein the plurality of development periods comprise completed and uncompleted development periods;
an implementation tracking module that calculates, for each development period, the total work i) planned for and ii) completed during the development period; and
a resource planning module that calculates a total available work capacity of the plurality of resources for each uncompleted development period; and
a feature tracking module that calculates, for each feature of the software application, i) an amount of work completed for the feature and ii) an amount of work in progress for the feature;
wherein at least a portion of the feature profile module, the task profile module, the resource profile module, the implementation tracking module, the resource planning module, and the feature tracking module comprise one or more of hardware and executable code, the executable code stored on one or more computer readable storage media.

2. The apparatus of claim 1, wherein the implementation tracking module further calculates a completion index of the software application.

3. The apparatus of claim 1, wherein the feature tracking module further determines the status for each feature of the software application.

4. The apparatus of claim 3, wherein the feature tracking module determines the status of each feature of the software application comprises:
calculating a work gap for the software application;
in response to the work gap being equal to zero or less, determining that the status of each feature is positive; and
in response to the work gap being greater than zero, examining each feature by ascending priority, wherein examining each feature comprises:
   decrementing the work gap by the amount of work remaining to implement the feature;
   in response to the work gap being equal to positive, determining that the status of the feature is negative; and
   in response to the work gap being equal to zero or less, determining that the status of the feature is positive.

5. The apparatus of claim 1, wherein the resource profile module calculating the available work capacity and the total work capacity of a resource during a development period comprises synching in real-time with a network-based calendar pertaining to the resource.

6. The apparatus of claim 1, wherein the resource planning module further determines whether an uncompleted development period has a work capacity deficit.

7. The apparatus of claim 6, further comprising a notification module that generates a notification in response to the resource planning module determining that an uncompleted development has a work capacity deficit.

8. A method for facilitating management of agile software development projects comprising:
   storing, by processor, for each feature of a software application, i) a status of the feature, ii) a priority of the feature, iii) a set of tasks associated with the feature, iv) an amount of work to implement the feature;
   storing, by processor, for each task associated with a feature of the software application, i) an amount of work to complete the task, ii) a status, and iii) an associated development period;
   calculating, by processor, for each resource of a plurality of resources assigned to develop the software application, an available work capacity and a total work capacity for the resource during a plurality of development periods, wherein the plurality of development periods comprise completed and uncompleted development periods;
   calculating, by processor, for each development period, the total work i) planned for and ii) completed during the development period; and
   calculating, by processor, a total available work capacity of the plurality of resources for each uncompleted development period; and
   calculating, by processor, for each feature of the software application, i) an amount of work completed for the feature and ii) an amount of work in progress for the feature.

9. The method of claim 8, further comprising calculating a completion index of the software application.

10. The method of claim 8, further comprising determining the status for each feature of the software application.

11. The method of claim 10, wherein determining the status of each feature of the software application comprises:
   calculating a work gap for the software application;
   in response to the work gap being equal to zero or less, determining that the status of each feature is positive; and
   in response to the work gap being greater than zero, examining each feature by ascending priority, wherein examining each feature comprises:
      decrementing the work gap by the amount of work remaining to implement the feature;
      in response to the work gap being equal to positive, determining that the status of the feature is negative; and
      in response to the work gap being equal to zero or less, determining that the status of the feature is positive.

12. The method of claim 8, wherein calculating the available work capacity and the total work capacity of a resource during a development period comprises synching in real-time with a network-based calendar pertaining to the resource.

13. The method of claim 8, further comprising determining whether an uncompleted development period has a work capacity deficit.

14. The method of claim 8, further comprising generating a notification in response to determining that an uncompleted development has a work capacity deficit.

15. A computer program product for managing agile software development projects, the computer program product comprising a computer readable storage medium having program instructions embodied therewith, the program instructions readable/executable by a processor to cause the processor to:
   storing, by processor, for each feature of a software application, i) a status of the feature, ii) a priority of the feature, iii) a set of tasks associated with the feature, iv) an amount of work to implement the feature;
   storing, by processor, for each task associated with a feature of the software application, i) an amount of work to complete the task, ii) a status, and iii) an associated development period;
   calculating, by processor, for each resource of a plurality of resources assigned to develop the software application, an available work capacity and a total work capacity for the resource during a plurality of development periods, wherein the plurality of development periods comprise completed and uncompleted development periods;
   calculating, by processor, for each development period, the total work i) planned for and ii) completed during the development period; and
   calculating, by processor, a total available work capacity of the plurality of resources for each uncompleted development period; and
   calculating, by processor, for each feature of the software application, i) an amount of work completed for the feature and ii) an amount of work in progress for the feature.

16. The computer program product of claim 15, the program instructions further causing the processor to calculate a completion index of the software application.

17. The computer program product of claim 1, wherein program instructions further causing the processor to determine the status for each feature of the software application.

18. The computer program product of claim 1, wherein calculating the available work capacity and the total work capacity of a resource during a development period comprises synching in real-time with a network-based calendar pertaining to the resource.

19. The computer program product of claim 1, wherein program instructions further causing the processor to determine whether an uncompleted development period has a work capacity deficit.

20. The computer program product of claim 1, wherein program instructions further causing the processor to generate a notification in response to determining that an uncompleted development has a work capacity deficit.

* * * * *